US008682392B2

(12) United States Patent  
Gelbman et al.

(10) Patent No.: US 8,682,392 B2
(45) Date of Patent: Mar. 25, 2014

(54) MULTIMODE BASE STATION AND METHOD OF OPERATION

(75) Inventors: Peter Gelbman, Kirkland, WA (US); Durga Prasad Satapathy, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 82 days.

(21) Appl. No.: 13/338,096

(22) Filed: Dec. 27, 2011

(65) Prior Publication Data

US 2013/0077966 A1 Mar. 28, 2013

Related U.S. Application Data

(60) Provisional application No. 61/539,387, filed on Sep. 26, 2011.

(51) Int. Cl.
*H04M 1/00* (2006.01)
(52) U.S. Cl.
USPC .............. 455/561; 455/67.11; 455/67.13; 455/423; 455/424; 455/522
(58) Field of Classification Search
USPC ............... 455/561, 67.11, 67.13, 68, 69, 455/423–425, 522, 500; 370/328, 276, 277, 370/282, 295
See application file for complete search history.

(56) References Cited

U.S. PATENT DOCUMENTS 8,204,544 B2 * 6/2012 Beaudin et al. ............... 455/561
2011/0287791 A1 * 11/2011 Fujishima et al. ............ 455/500

* cited by examiner

*Primary Examiner* — Manpreet Matharu

(57) ABSTRACT

A base station includes multiple transmitter-receiver elements coupled to multiple antennas. The activation of additional baseband signal processing resources, dynamically mapped via a programmable digital interface module to a subset of the original transmitter-receiver sets in the base station to double capacity of the system or facilitate simultaneous operation of multiple air interface technologies with minimal or no hardware modifications to the base station or cell site. With a base station having four transmitter-receivers, the system transmits and receives the same signal on all transmitter-receivers to provide a 4×2 downlink and a 1×4 uplink. The system can be reconfigured by splitting the transmitter-receiver sets into two logically separate units. An additional base station modem resource is activated to double the capacity of the radio system or to implement a different communication protocol allowing transition between technologies.

35 Claims, 6 Drawing Sheets

MULTIMODE BASE STATION AND METHOD OF OPERATION

BACKGROUND OF THE INVENTION

1. Field of the Invention

The present disclosure relates generally to a wireless communication system base station and, more particularly, to a base station having reconfigurable transceivers.

2. Description of the Related Art

An effective wireless communication network requires a large number of base stations to provide adequate coverage over a desired geographic area. For coverage in a metropolitan area, base stations may be located on the rooftop of buildings. For coverage of the larger geographic area, such as nationwide coverage, a large number of base stations are constructed with base station towers.

In early base station designs, the antennas were mounted on the top portion of the tower and all of the associated electrical circuitry was located at the bottom of the tower, usually in a building to provide shelter. The shelter includes the radio frequency (RF) transmitters and receivers as well as environmental control battery back-up systems, and the like. The transmitters and receivers on the ground were coupled to the antenna systems at the top of the tower by large diameter RF coaxial cables. Those skilled in the art will appreciate that the cable losses using coaxial cable can be as much as 3 dB thus reducing power by 50%.

These early base station designs have been updated to use a remote radio head (RRH) mounted on top of the tower in close proximity to the antenna system. The greatly reduced length of coaxial cable avoids the signal losses described above. In this arrangement, all radio frequency (RF) circuitry is located atop the base station tower. Electrical circuitry in the form of baseband modems is located at the bottom of the tower. In a typical arrangement, the baseband modems are coupled to the RRH via a fiber optic cable. The optical fiber provides wide bandwidth connectivity with virtually no signal loss.

The disadvantage of existing systems is their lack of flexibility and remote programmability. The present disclosure is directed to a base station system that is reconfigurable to accommodate changes in operational modes and the ability to adapt to changes in traffic density. The present disclosure provides this and other advantages as will be apparent from the following detailed description and the accompanying figures.

BRIEF DESCRIPTION OF THE SEVERAL VIEWS OF THE DRAWING(S)

DETAILED DESCRIPTION OF THE INVENTION

The present disclosure is directed to the operation of a base station having a remote radio head and the reconfiguration of the transceivers in the remote radio head.

In early implementations using a remote radio head (RRH) the base station tower includes two transmitters and two receivers (2T2R) mounted on top of the tower and coupled to a cross polarized antenna to provide two functionally independent antennas. This implementation is typical for a multiple-input multiple-output (MIMO) channel used to implement a base station in accordance with, by way of example, IEEE 802.16e, or 3GPP Release 8, LTE. In such an implementation, the base station includes two transmitters and two receivers such that the downlink from base station to mobile unit is transmitted simultaneously by both transmitters where the transmitters are coupled to respective ones of the antennas. This is the multiple-output aspect of a MIMO system. The mobile unit (not shown) typically has a single transmitter and two receivers. Thus, the downlink channel may be referred to as 2×2 because there are two transmitters on the downlink and two receivers on the downlink. In contrast, the mobile unit has only a single transmitter on the uplink while the conventional base station uses two antennas coupled to the respective inputs of the two receivers in the RRH, i.e., multiple-input. This is referred to as a 1×2 uplink because there is a single transmitter and two receivers on the uplink.

Figure 1:
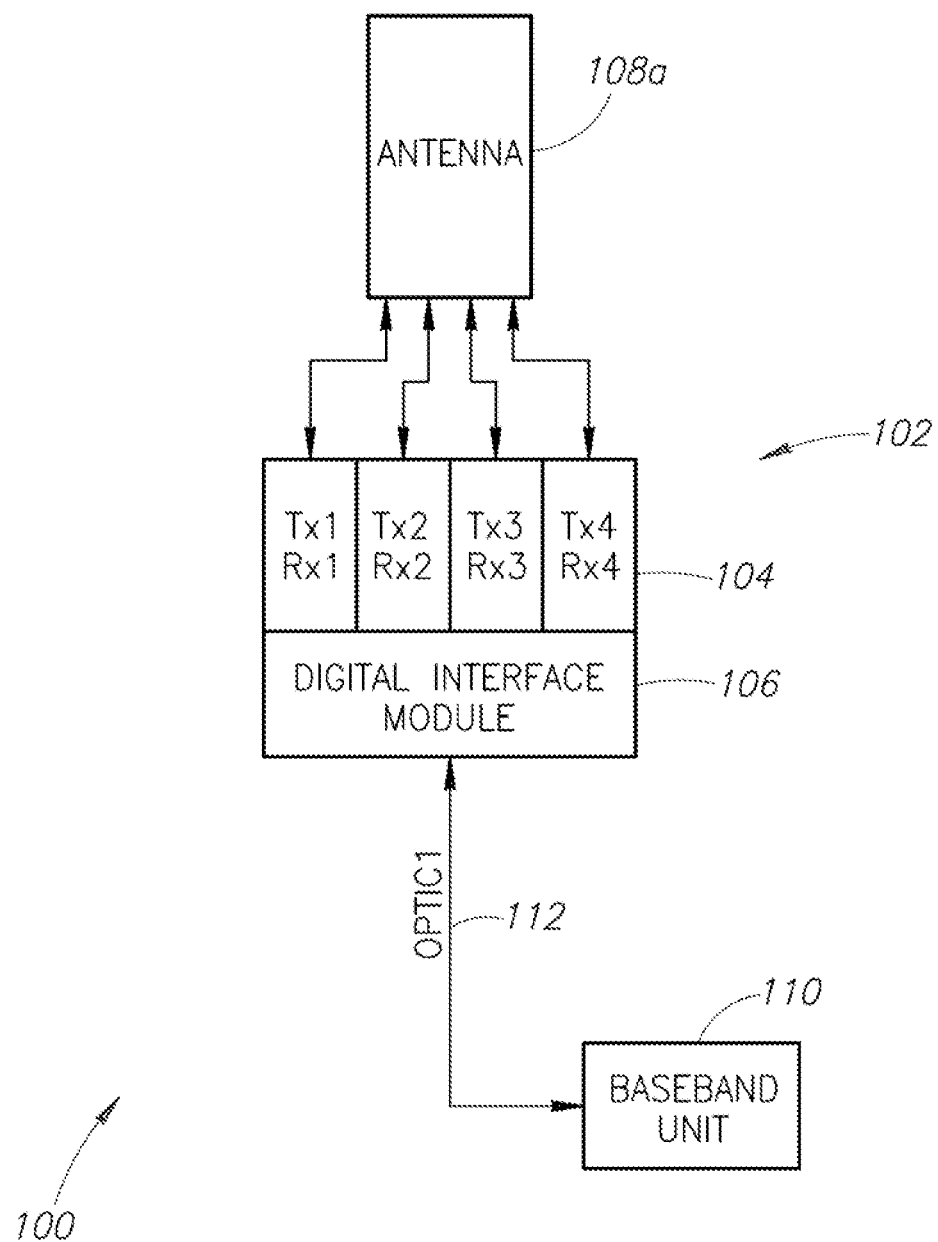
FIG. 1 is a functional block diagram of a remote radio head and single baseband modem.
Figure 3:
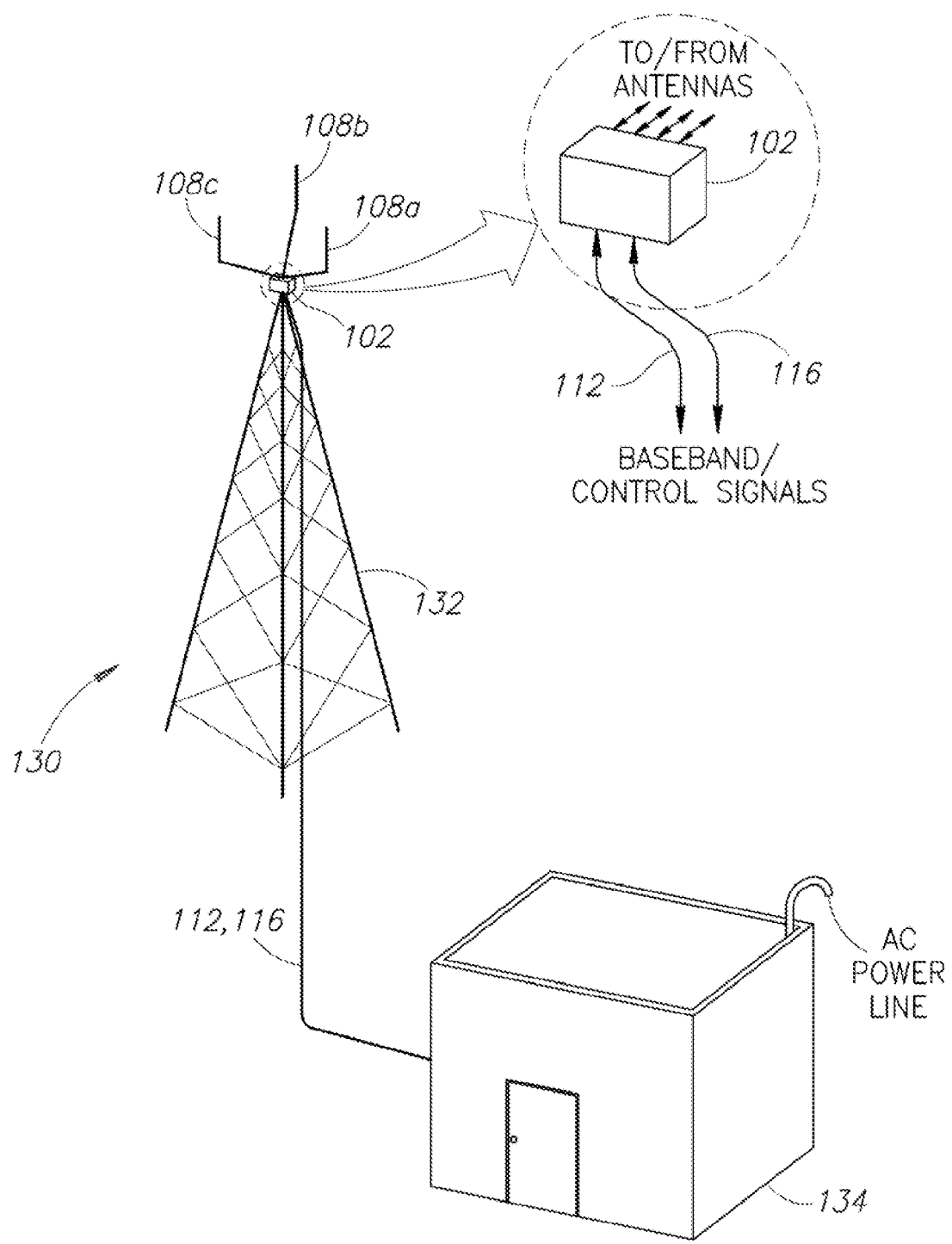
FIG. 3 illustrates an exemplary physical arrangement of a base station.

This older technology is replaced with a system 100 illustrated in FIG. 1. The system 100 includes a transceiver system or remote radio head (RRH) 102 that comprises four separate transmitter-receiver sets 104. These are designated as Tx1Rx1 through Tx4Rx4, respectively. Those skilled in the art will appreciate that these devices can share circuitry and be implemented as transceivers. However, they are labeled separately herein because the transmit and receive operations are separate functions. The RRH 102 also includes a digital interface module 106. The digital interface module 106 will be described in greater detail below. The outputs of the transmitter-receiver sets 104 are each coupled to an antenna 108a. A typical base station 130 is illustrated in FIG. 3. The base station 130 includes a base station tower 132 and a control room 134 located at or near the base of the base station tower 132. The control room 134 typically receives AC power, but generally includes battery back-ups and/or a back-up generator for use during power outages. These are conventional components that need not be described in greater detail herein. The control room 134 also houses the circuitry to communicate with the RRH 102 as well as circuitry (not shown) to communicate with a base station controller or other network components via a back haul communication link. These are also conventional components of a wireless network that need not be described in greater detail herein.

Those skilled in the art will appreciate that a typical base station has a roughly circular arc of coverage that is subdivided into sectors. In the embodiment illustrated in FIG. 3, the base station 130 has three sectors. Each sector is served by a different antenna and a different RRH. In FIG. 3, the base station 130 includes antennas 108a-108c. Communication within each sector is conducted essentially independently of the other sectors. For the purposes of the present discussion, each of the sectors has its own RRH 102 that is coupled to the respective antennas 108a-108c. For the sake of clarity, the present discussion will focus on the antenna 108a and its associated RRH 102.

Returning to FIG. 1, the antenna 108a is a quad cross-polarized antenna. Operationally, the antenna 108a functions as four separate antennas to permit MIMO operation. In the embodiment of FIG. 1, the system 100 operates as a 4×2 downlink with a 1×4 uplink. That is, the four transmitter-receiver sets 104 each transmit the same signal to the corresponding part of the antenna 108a thus providing a four channel MIMO downlink signal. As noted above, the typical mobile unit (not shown) includes one transmitter and two receivers. On the uplink, the single transmitter in the mobile unit transmits a signal that is detected by all four antennas in the antenna 108a and received by the receivers in each of the four transmitter-receiver sets 104 (i.e., a 1×4 uplink).

All of the radio frequency (RF) circuitry is located in the RRH 102. This includes conventional circuitry such as the transmitter and receiver circuits, antenna diplexer, power amplifiers, low power pre-amplifiers, and the like. These are conventional components whose operation is well understood and whose operation need not be discussed in greater detail herein.

With highly efficient power, multi-carrier power amplifier (MCPA) technology, the transmitter-receiver sets 104 can support 30 MHz or greater of instantaneous channel bandwidth, which permits the operation of three 10 MHz or more carriers per sector across the four transmitters. This allows for extensive coverage and capacity in a small package as compared with the conventional 3G base stations with the RF equipment at the bottom of the base station and the antenna only at the top of the base station tower.

Each of the transmitter-receiver sets 104 are coupled to the digital interface module 106. In turn, the digital interface module 106 is coupled to a baseband unit 110 by a fiber optic cable 112. The signals between the digital interface module 106 and the baseband unit 110 are low power baseband signals that can easily be carried on the fiber optic cable 112. The digital interface module 106 is a conventional digital interface module that receives optical signals from the baseband unit, converts the optical signals into corresponding electrical signals, and routes the electrical signals to the appropriate transmitters. The digital interface module 106 is typically implemented by means of a field programmable gate array (FPGA), but may be any programmable digital module which terminates optical signals, converts them to electrical signals, and dynamically routes the signals to the appropriate input section of transmitter. On the uplink side, the digital interface module 106 receives the output signals from each of the receivers in the transmitter-receiver sets 104 and converts the electrical signals into optical signals for transmission to the baseband unit 110. A similar digital interface module in the baseband unit converts the optical signals from the digital interface module 106 into electrical signals and routes them to baseband unit 110 for processing and demodulation. On the downlink, the baseband unit modulates the data to generate the desired baseband signals and a digital interface module in the baseband unit converts the electrical signals to an optical signal for transmission to the digital interface module 106.

There are a number of different techniques by which the digital interface module 106 may be implemented. In one implementation, the interface may be proprietary. However, for convenience and greater industry compatibility the digital interface module 106 can be constructed in accordance with the Common Public Radio Interface (CPRI) standards. This industry-developed interface standard provides for data flow control and management. The implementation of the digital interface module 106 in accordance with CPRI is known in the art and need not be described in greater detail herein. However, it is understood that on the downlink side the digital interface module receives the optical signals from the baseband unit and routes them to the designated one or more of the transmitters in the transmitter-receiver sets 104. Similarly, on the uplink side, the digital interface module 106 receives data signals from the receivers in the transmitter-receiver sets 104 and converts the electrical signals into optical signals for transmission to the baseband unit via the fiber optic cable 112.

In an alternative embodiment, the digital interface module 106 may be constructed in accordance with an Open Base Station Architecture Initiative (OBSAI). Like CPRI, OBSAI has been developed by a number of manufacturers to assist in the design of standardized base stations. The operation of the digital interface module in accordance with the OBSAI is also known in the art and need not be described in greater detail herein. It should be understood that the digital interface module 106 may be custom designed or designed in accordance with a standard other than CPRI or OBSAI. Furthermore, the interface between baseband and radio sections is not restricted to fiber; the multi-modal concepts embodied herein may be applied to a variety of radio architectures, including but not limited to intermediate frequency (IF), which would use analog signals between baseband and RF sections, or any digital interface. Thus, the digital interface module 106 is described in a functional manner herein, but may be engineered using a variety of different known technologies The configuration of the system 100 in FIG. 1 eliminates the RF power losses from coaxial cable carrying RF signals from the bottom of the base station tower 132 to the top. In addition, the four transmitter four receiver (4T4R) configuration in FIG. 1 provides 3-5 dB greater coverage than the standard 2T2R MIMO arrangement discussed above.

With the transmitter-receiver sets 104, the system 100 can take advantage of a range of advanced MIMO and beamforming features that are enabled in IEEE 802.16m as well as 3GPP Long-Term Evolution (LTE) standards. These features allow the capacity of the system to be increased by as much as 20-30%.

Figure 2:
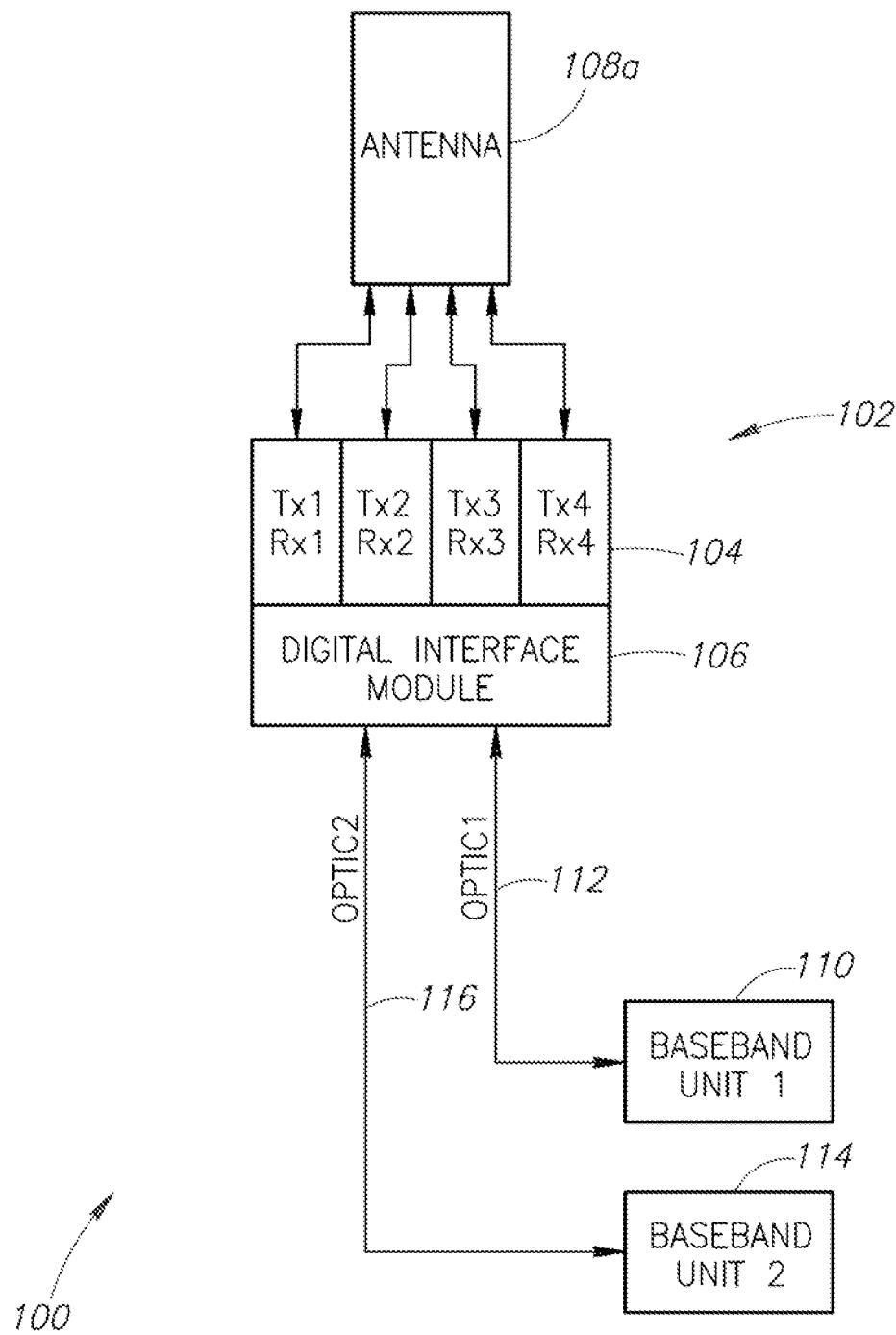
FIG. 2 illustrates a modification to the system of FIG. 1 to accommodate additional traffic or additional operational modes.

In addition to the advantages provided by the system design in FIG. 1, the architecture provides significant flexibility for adaptation to a larger number of subscribers and to different operational modes. FIG. 2 illustrates the versatile architecture of the system 100. Instead of operating with all four transmitter-receiver sets 104 operating in a single set (i.e., 4×2) it is possible to reconfigure the four transmitter-receiver sets 104 to operate in two independent 2×2 operational modes. At the point where the network/subscriber demand exceeds three channels worth of capacity, the same system 100 in FIG. 2 can support a partitioning of the four transmitter-receiver sets 104 into two independent sets of 2×2 radio heads. This creates two logically separate base stations operating out of the same RRH 102. As illustrated in FIG. 2, an additional baseband unit 114 is added to the system 100 and coupled to the digital interface module 106 via a fiber optic cable 116. In many cases, the second fiber optic cable 116 may already be installed between the RRH 102 and the bottom of the base station tower such that the conversion illustrated in FIG. 2 would not even require climbing the tower to install a second fiber optic cable. The examples presented herein show the addition of baseband unit 114 as a separate baseband unit. It is worth noting that the addition of a channel/bandwidth also refers to enablement of additional baseband processing resources within a single baseband unit. A "baseband unit" may refer to a variety of digital signal processing architectures; the baseband bandwidth augmentation principles described herein may be applied to any baseband architecture. In typical implementations, "baseband units" are comprised of one of more digital signal processors (DSPs), which may already be resident within a modem card, but are not all fully utilized, or enabled. In an alternative embodiment, there may be a single baseband hardware card, which contains multiple DSPs. In the early stage where a single DSP may be responsible for the processing of a single 10 MHz baseband channel which is routed to all of the transmitter-receiver chains. At the later capacity augment stage, a second DSP within the baseband hardware card may be activated, to now enable a second 10 MHz channel to be routed via the digital interface module to a partitioned subset of the transmitter-receiver sets, doubling the system capacity to 20 MHz, with the addition of no hardware whatsoever. It should be understood that the novel concept of multi-modal capacity augmentation is facilitated by the activation of additional baseband signal processing resources, which are dynamically mapped via a programmable digital interface module to a subset of the original transmitter-receiver sets in the base station, thereby doubling capacity of the system. Thus, the baseband units 110 and 114 are described in a functional manner as separate components herein, but may be engineered using a variety of different known baseband technologies.

In an alternative embodiment, the fiber optic cable 112 can provide sufficient bandwidth to couple both the baseband unit 110 and the baseband unit 114 to the RRH 102 using only a single fiber optic cable. In this embodiment, it is also unnecessary for technical personnel to climb the tower to install an additional fiber optic cable (e.g., the fiber optic cable 116) to implement the configuration illustrated in FIG. 2.

In the embodiment illustrated in FIG. 2, the digital interface module 106 is configured to provide baseband signals between the baseband unit 110 and two of the transmitter-receiver sets 104 (e.g., the transmitter-receiver Tx3Rx3-Tx4Rx4) while the optical router also routes signals between the baseband unit 114 and the remaining pair of the transmitter-receiver sets 104 (e.g., the transmitter-receiver Tx1Rx1-Tx2Rx2). No reconfiguration of the antenna 108a is required since the transmitter-receiver sets 104 are each coupled to one of the four antennas. Following reconfiguration of the transmitter-receiver sets 104 from a 4×2 configuration to a 2×2 configuration, the antennas in the antenna 108a are automatically reconfigured. Thus, it is not necessary to climb the base station tower 132 (see FIG. 3) to reconfigure the antenna 108a. As those skilled in the art will appreciate, the digital interface module 106 may be remotely programmed thus eliminating hardwired changes that necessitate climbing the base station tower 132.

In one embodiment, the baseband unit 110 and the baseband unit 114 are functionally identical. This allows the simple and substantially immediate doubling of capacity for the system 100. With this change, the system 100 now comprises two logically separate base stations operating out of the same RRH 102. Each partitioned 2×2 radio can now be tuned to a new 30 MHz band and support three additional 10 MHz RF carriers each of which is logically remapped to its own baseband modem (e.g., the baseband unit 110 or the baseband unit 114) on the ground. At this point, the capacity of the system 100 has been doubled for a total of 60 MHz of bandwidth and 6 channels per sector. For example, the system 100 can be configured in FIG. 1 in accordance with IEEE 802.16e, sometimes referred to as WiMAX. To reconfigure the system 100 as illustrated in FIG. 2, the second baseband unit 114, also configured in accordance with IEEE 802.16e, can be installed to thereby double the WiMAX capacity of the system 100. The examples presented herein are directed to implementations using 10 MHz channels, MCPA bandwidths of 30 MHz, and systems capacity migrations to 60 MHz. However, the principles described herein may be applied to any system bandwidth. For example, a WCDMA system may utilize 5 MHz channels, with MCPA's capable of supporting three WCMDA channels for a bandwidth of 15 MHz. In this example, each of two partitioned 2×2 radios may each support three channels, and the system 100 would now support 6 WCDMA channels for a total doubled bandwidth of 30 MHz. Another example would be an LTE system utilizing 20 MHz channels with MCPA's capable of supporting two LTE channels for a bandwidth of 40 MHz. In this example, each of two partitioned 2×2 radios may each support two channels, and the system 100 would now support four LTE channels for a total doubled bandwidth of 80 MHz.

Those skilled in the art will appreciate that the trade-off for the increased bandwidth means the gains provided by advanced 4×2 downlink and 1×4 uplink MIMO and beamforming features may not be implemented. However, doubling of the capacity is well worth the reduction in MIMO and beamforming capacity. In addition, the reconfiguration illustrated in FIG. 2 is generally performed when the area surrounding the base station 130 (see FIG. 3) and the system 100 is relatively mature. That is, the geographic region covered by the system 100 already has a well-established system of base stations with overlapping areas of coverage, as is known in the art. Thus, the configuration illustrated in FIG. 2 can double the capacity in already developed wireless communication system. In contrast, prior art systems would have to address the increased need for capacity by adding additional cell sites, cell splitting, antenna reconfiguration, and the like. This generally involves the installation of new equipment and the associated increased cost of equipment and installation. The system 100 can double the capacity at a considerably lower cost for hardware and installation.

The examples presented herein are directed to implementations using 4T4R systems which operate as a 4×2 downlink and 1×4 uplink, which would be partitioned into two logical 2T2R systems, each operating as a 2×2 downlink and 1×2 uplink. However, the principles described herein may be applied to virtually any combination of transmitters and receivers. For example, an 8T8R system which operates as a 8×2 downlink and 1×8 uplink may be partitioned into two logical 4T4R systems, each operating as a 4×2 downlink and 1×4 uplink. An additional embodiment would be an 4T8R system which operates as a 4×2 downlink and 1×8 uplink could be partitioned into two logical 2T4R systems, each operating as a 2×2 downlink and 1×4 uplink. Additionally, the examples presented herein are all directed to mobile configurations which describe the mobile as having 2 receivers and 1 transmitter. However, the principles described herein may be applied to any configuration of transmitters and receivers on the mobile side as well. Using the 4T4R base station example, previously we describe its basic operating mode as 4×2 downlink and 1×4 uplink. Such base station may also support mobile units which have 4 receivers and 2 transmitters; in which case the base station would operate as a 4×4 downlink an 2×4 uplink. The modality functions as they relate to MIMO, coverage, bandwidth and capacity benefits described herein may be applied to all of these base station and mobile unit configurations. Additionally, it should be noted that while cross-polarized antennas are used in the examples, the principles described herein may be applied to any antenna configuration, such as uniform linear array (ULA). Thus there is no restriction on radio architecture implementation, or antenna types.

In yet another configuration, the system 100 illustrated in FIG. 2 can be configured to migrate to newer communications technologies. For example, the transmitter-receiver set 104 can be subdivided from the 4×2 configuration described with respect to FIG. 1 to a 2×2 configuration illustrated in FIG. 2. However, instead of the baseband unit 114 being functionally identical to the baseband unit 110, it is possible to substitute a different baseband unit 114 operating using a different communication protocol. In one example, the baseband unit 114 is a modem configured for operation in accordance with LTE. In this configuration, the baseband unit 110 is coupled through the digital interface module 106 to two of the transmitter-receiver sets 104 (e.g., the transmitter-receiver sets Tx3Rx3-Tx4Rx4). These transceivers and the baseband unit 110 may be configured, for example, to operate in accordance with IEEE 802.16e. This portion of the system 100 provides a 2×2 downlink and a 1×2 uplink.

At the same time, the digital interface module 106 is configured to couple the baseband unit 114 to the remaining two transmitter-receiver sets 104 (e.g., transmitter-receiver sets Tx1Rx1-Tx2Rx2). In this embodiment, the baseband unit 114 is configured for operation in accordance with, for example, LTE. This configuration provides for a simple and low cost migration to different technology simply by replacing or installing the baseband unit 114 that operates in accordance with the new operational mode (e.g., LTE). In this configuration, each of the dual sets of transmitter-receiver 104 provides a 2×2 downlink and a 1×2 uplink with each operating independently of the other and in accordance with the selected communication protocol.

As discussed above, the digital interface module 106 may be coupled to the baseband units 110 and 114 using the separate fiber optic cables 112 and 116, respectively. As noted, the system 100 often includes the second fiber optic cable 116 even in the configuration illustrated in FIG. 1. Alternatively, the digital interface module 106 may be coupled to both baseband units 110 and 114 by a single fiber optic cable (e.g., the fiber optic cable 112) if the fiber optic cable can provide sufficient bandwidth. In the examples presented herein, the fiber optic cable must be capable of providing at least 60 MHz of bandwidth (e.g., 3×10 MHz for each of the two baseband units 110 and 114).

At a future time, the baseband unit 110 could be reconfigured for operation with a new operational mode, such as LTE. This would allow a transitional change between a first operational standard (e.g., IEEE 802.16e) to a different operational mode (e.g., LTE). These operational changes can generally be performed simply by replacing the baseband unit (i.e., the baseband unit 110 and/or the baseband unit 114) and reconfiguring the digital interface module 106 in the manner described above. The process can generally be completed without requiring climbing the base station tower 132.

Although the examples presented herein are directed to implementations of IEEE 802.16e/m, and 3GPP LTE, the principles described herein can be applied to other radio communication protocols. In one embodiment, the RRH 102 can include transmitter-receiver sets 104 that are capable of multi-mode operation. For example, the transmitter-receiver set 104 can operate in accordance with CDMA standards or WCDMA standards. The same operational principle described above can be used to double CDMA capacity or make a transition from CDMA to WCDMA. Thus, the principles of the system 100 described herein are not limited to a particular radio communication protocol.

In the embodiment of FIG. 2 described above, the transmitter-receiver sets 104 were reconfigured from a 4×2 configuration to two logically independent base stations, each operating in a 2×2 mode on the downlink. In some embodiments, the transmitter portions of the transmitter-receiver sets 104 are able to use a single RF power amplifier. This mode, sometimes referred to as a mufti-carrier power amplifier (MCPA), can simplify circuit design to support multiple radio channels. However, those skilled in the art will appreciate that due to practical challenges of linearity and efficiency associated with high power amplifier design, the MCPA is typically optimized for performance over a relatively small RF bandwidth. Thus, the MCPA operational mode may not be possible for all four transmitters in the transmitter-receiver sets 104.

In contrast, the receivers in the transmitter-receiver sets 104 can be designed for satisfactory operation over a much broader RF bandwidth. Because of this operational feature, it is possible to configure the system 100 in FIG. 2 for 2×2 operation on the downlink and 1×4 operation on the uplink. That is, the outputs from each of the transmitter-receiver sets 104 are delivered to both baseband units 110 and 114. This is true whether the baseband modems in the baseband units 110 and 114 are operating in the same mode or in different modes. The advantage of the 1×4 uplink configuration is known to those of ordinary skill in the art. For example, the four antenna elements provide greater spatial diversity. In this operational mode, the signals from all four receivers are routed to the digital interface module 106. In turn, the digital interface module 106 sends the identical signal to both baseband units 110 and 114. Each baseband unit 110 and 114 will detect and process its own signals while essentially ignoring the signals intended for the other baseband unit. For example, if the baseband unit 110 is configured for operation in accordance with IEEE 802.16e, it will not process signals that are received in accordance with, by way of example, LTE. In turn, the baseband unit 114 may be configured for operation in accordance with LTE and will not process the IEEE 802.16e signals. Thus, the system 100 maintains four receivers per channel and does not lose any link budget on the uplink. Those skilled in the art will appreciate that any wireless communication system is generally more limited on the uplink because of the relatively low power of transmitters in the mobile units as well as the use of a single transmitter in the mobile units while base station transmitters use two or more transmitters. The implementation of the system in a 1×4 uplink mode provides a strong uplink signal while still allowing the expansion or transition by separating the transmitters in the manner described above.

Figure 4:
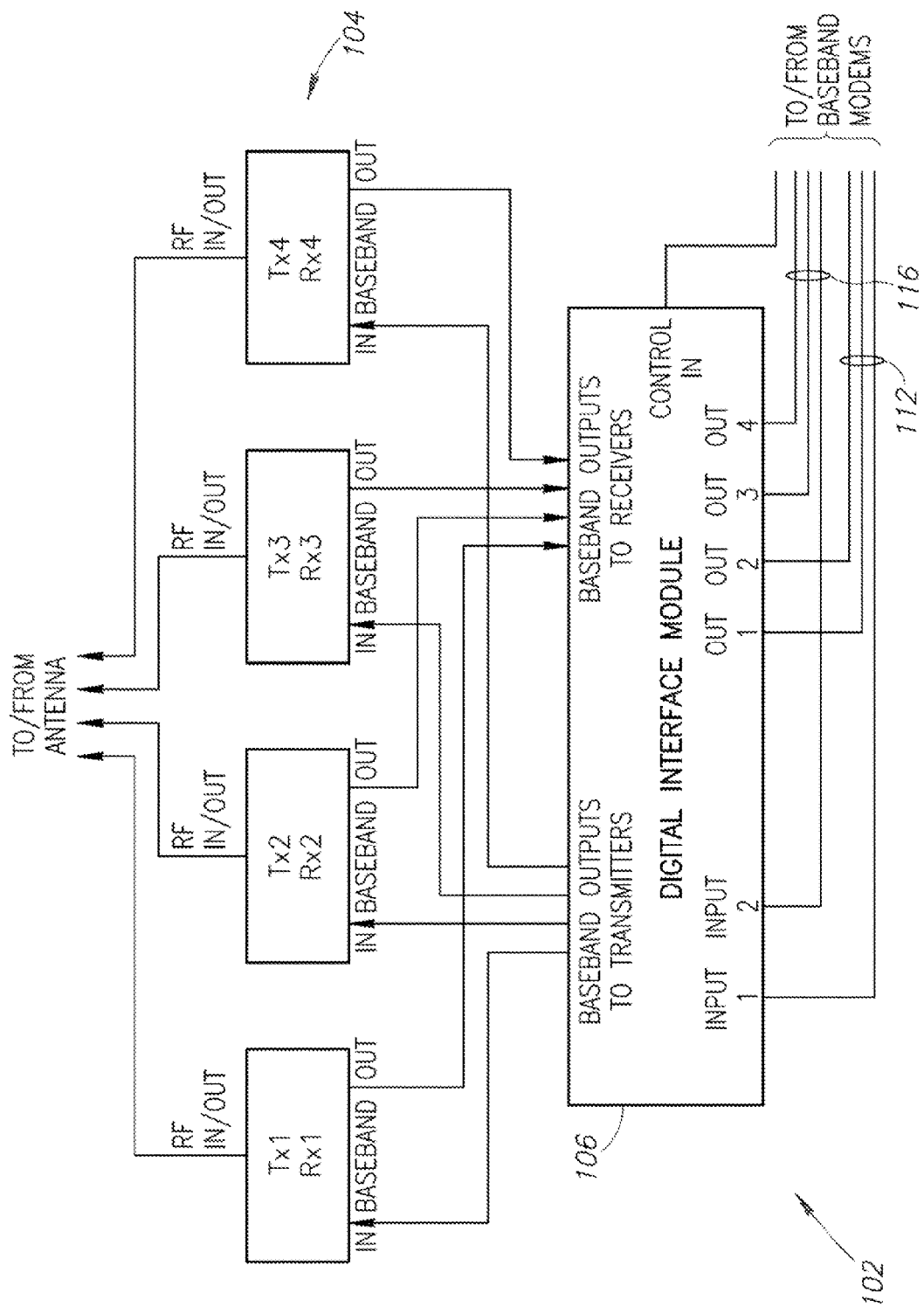
FIG. 4 is a detailed functional block diagram of a remote radio head.

Functional details of the RRH 102 are provided in FIG. 4. The digital interface module has two sets of inputs and two sets of outputs. In the examples presented herein, the first input and first output are coupled to the baseband unit 110 while the second input and second output are coupled to the baseband unit 114. The digital interface module 106 also has four outputs that are directed to input lines on the respective transmitters in the transmitter-receiver sets 104. Similarly, the digital interface module has four inputs that are coupled to the respective outputs of the transmitter-receiver sets 104.

The actual routing of signals depends on the configuration of the digital interface module 106. In one example discussed above, the remote radio head 102 is configured for a 4×2 downlink operation. In this configuration, the output signal from the baseband unit 110 is coupled to input 1 on the digital interface module. Internally, the signal from the baseband unit 110 is connected to all four outputs on the digital interface module 106 and thus delivered as inputs to all four of the transmitters in the transmitter-receiver sets 104. Thus, the identical signal is transmitted by all four transmitter-receiver sets 104.

In a 1×4 uplink configuration, the signal from the antenna 108a (see FIG. 1) is coupled to all four receivers in the transmitter-receiver sets 104. In turn, the output signal from the transmitter-receiver sets is coupled to the four inputs on the digital interface module 106. In one embodiment, illustrated in FIG. 4, the output from each of the four receivers in the transmitter-receiver sets 104 are routed separately to the baseband unit 110 (see FIG. 2). The output signals from the digital interface module 106 may be carried on optical fibers in the optical fiber cables 112 and 116, as illustrated in FIG. 4. Alternatively, a single optical fiber may carry multiple signals. One of ordinary skill in the art will appreciate that a number of different physical arrangements may be used to couple the output signals from the receivers of the transmitter-receiver sets 104 to the baseband unit 110 an/or the baseband unit 114, depending on the particular configuration.

The baseband unit 110 may typically utilize the four separate signals from the receivers in the transmitter-receiver sets 104 for MIMO processing in a conventional manner. Alternatively, the digital interface module 106 may perform some combining of signals from the receivers in the transmitter-receiver sets 104 to deliver combined signals to the baseband unit 110.

As discussed in detail above, the RRH 102 may be remotely configured. With the addition of the baseband unit 114 illustrated in FIG. 2, the digital interface module 106 is reconfigured. For a 2×2 downlink, the output signals from the baseband unit 110 are delivered to input 1 of the digital interface module while the output signals from the baseband unit 114 are delivered to input 2 of the digital interface module. In the examples discussed above, the signals from the baseband unit 110 are routed to the transmitter-receiver sets 3 and 4 (i.e., the transmitter-receiver sets). At the same time, the output signals from the baseband unit 114 are routed to the inputs of the transmitters in the remaining transmitter-receiver sets (i.e., the transmitter-receiver sets Tx1Rx1-Tx2Rx2).

For a 1×2 uplink configuration, the receivers in the third and fourth transmitter-receiver sets 104 (i.e., Tx3Rx3-Tx4Rx4) receive signals from the appropriate antennas 108a (see FIG. 2). Those output signals are coupled to the baseband inputs on the digital interface module and routed to the input of the baseband unit 110. Similarly, the remaining two antennas of the antenna 108a provide signals to the receivers in the first and second transmitter-receiver sets 104 (i.e., Tx1Rx1-Tx2Rx2). The output of those receivers is coupled to the remaining baseband inputs on the digital interface module and subsequently routed to the baseband unit 114 for further processing. For operation in a 1×4 configuration, the antennas of the antenna 108a are provided to all four receivers in the transmitter-receiver sets 104. The four outputs from the respective transmitter-receiver sets 104 are coupled to the baseband inputs on the digital interface module and combined as discussed above. In the 1×4 configuration, the digital interface module provides the identical output signals to both output 1 and output 2. In this manner, the identical signals are provided to both the baseband unit 110 and the baseband unit 114. Thus, the system 100 provides flexible configuration of the remote radio head to expand capacity and/or to transition from one technology to another.

Figure 5:
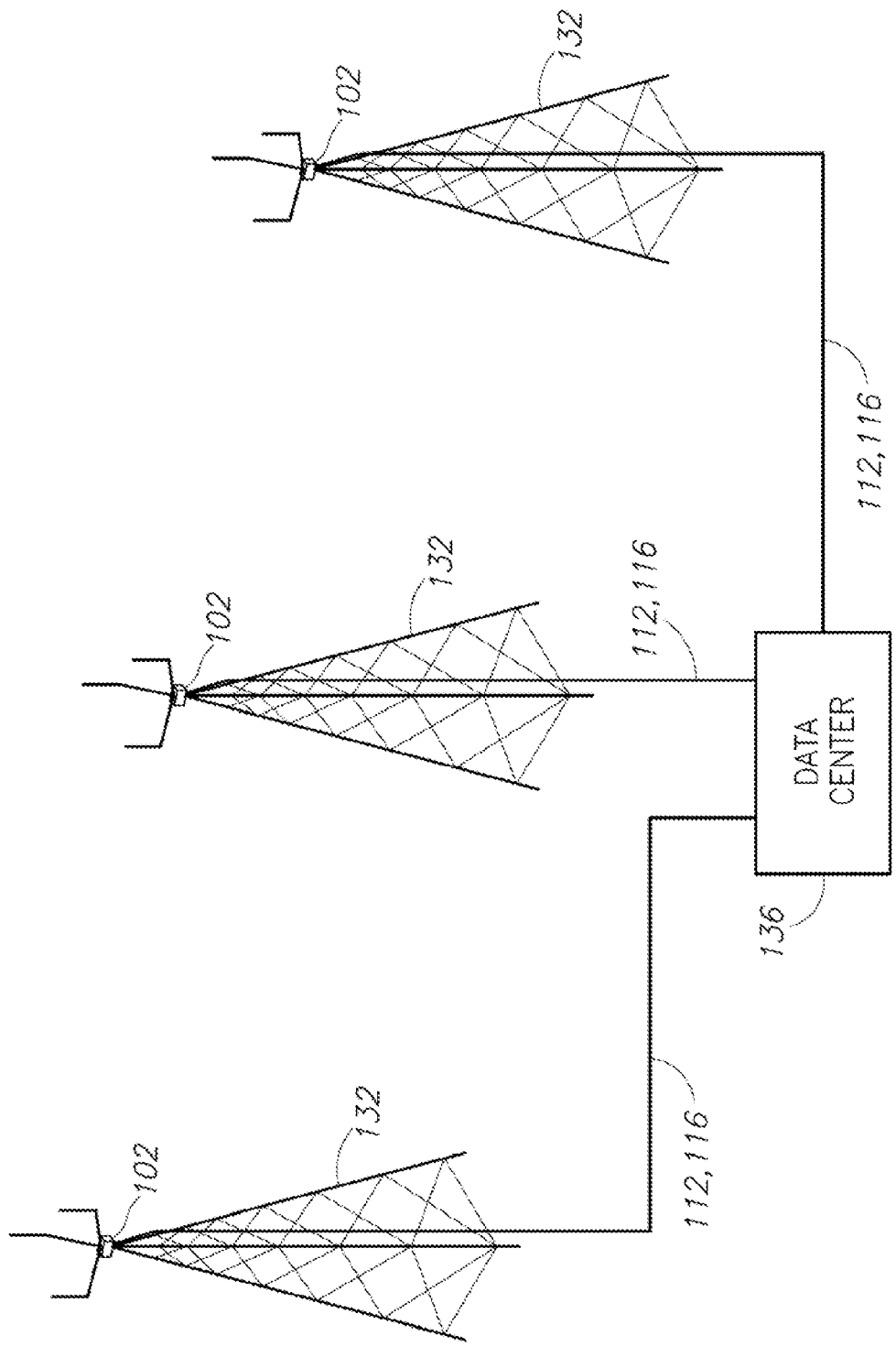
FIG. 5 illustrates an exemplary system architecture in which baseband resources are centrally located away from base stations.

The embodiments illustrated in FIG. 3 locates the RF circuitry at the top of the base station power 132 while the circuitry, such as the baseband unit 110 and the baseband unit 114 are located in the control room 134. While this is a common arrangement, it is not the only configuration permitted by the system 100. In an alternative embodiment illustrated in FIG. 5, the baseband units for a number of base stations are positioned in a centralized data center 136. The co-located baseband units are coupled to the respective base station towers by much longer runs of fiber optic cables 112 and 116 extending between each cell site base station 130 and the centralized data center 136. This may be referred to as a Cloud Radio Access Network (Cloud-RAN or C-RAN). Because there is relatively low signal loss on the fiber optic cables 112 and 116, the distance between the centralized baseband units and the RRH 102 can be significant. In this C-RAN arrangement, the centralized data center 136 includes equipment racks that house a number of baseband units (e.g., the baseband unit 110 and the baseband unit 114 for each base station) in racks. This allows the operator to centrally manage all of the baseband resources of many base stations in one location. This advantageously simplifies power and logistics as well as maintenance costs of the radio network. The principles described above regarding the bifurcation of the transmitters in the transmitter-receiver sets 104 still apply in the C-RAN configuration. That is, the transmitter-receiver sets 104 can still be remotely configured to operate in a mufti-modal configuration, such as a 1×4, 2×2, 1×2, and the like. As previously noted, these concepts can be extended beyond the example of four transmitter-receiver sets 104.

Figure 6:
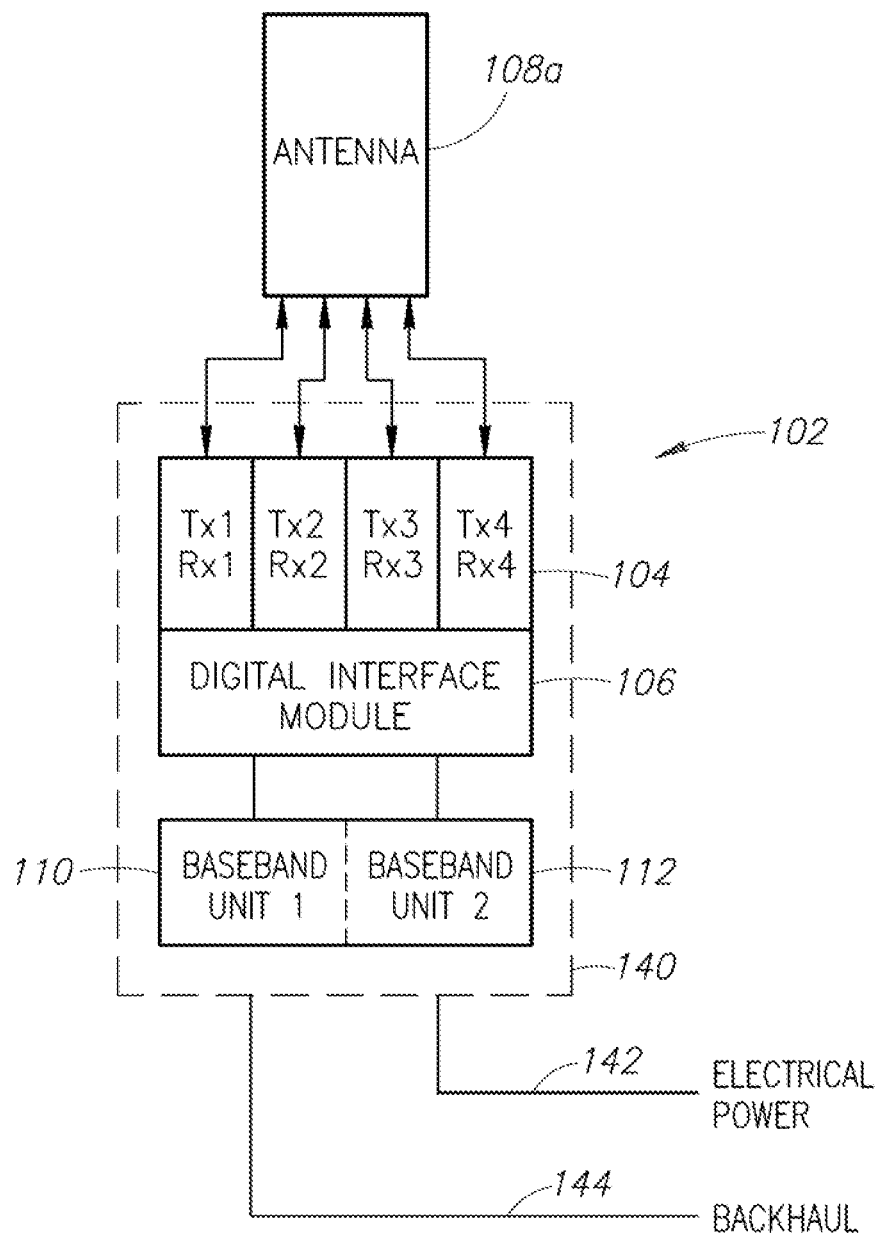
FIG. 6 illustrates a combined receiver system in which multiple transmitter-receiver sets and multiple baseband resources are co-located near the top of a base station tower.

FIG. 3 illustrates the positioning of the RF circuitry at the top of the base station tower 132 and the baseband unit in the control room located at or near the base of the base station power. However, in another alternative embodiment, the baseband circuitry may be co-located with the RF circuitry at or near the top of the base station tower 132, as illustrated in FIG. 6. In this embodiment, the baseband unit 110 and the baseband unit 114 in FIG. 2 are physically located at the top of the base station tower 132 and may be connected to the digital interface module 106 via a very short run of optical fiber cables (e.g., the optical fiber cable 112 and the optical fiber cable 116) using previously described digital interfaces such as CIPRI, OBSAI or a proprietary interface. Because of the short distance separating the baseband units 110 and 114 from the digital interface module 106, the interconnection may also be made using electrical wire interfaces in accordance with industry standard digital interfaces, such as Digi-RF or some other proprietary interface to facilitate the interconnection between the transmitter-receiver sets 104 and the baseband units 110 and 114. This combined base station architecture physically positions the baseband circuitry and the RF circuitry in a common box 140 and only requires electrical power 142 and a backhaul connection 144 from the top of the base station tower 132. The reconfiguration of the transmitter-receiver sets 104 can be readily accomplished via remote programming of the digital interface module 106 from a centralized location, such as the data center 136 in FIG. 5. As previously noted, many implementations do not require the physical addition of the baseband unit 114, but merely the activation or repartitioning of existing baseband/DSP modem resources that already exist in the box 140. The reconfiguration of the signal routing to and from the transmitter-receiver sets 104 may be accomplished dynamically by a field programmable gate array (FPGA) module such that any block of baseband resources can be mapped to any block of RF resources. In other words, any baseband unit may be mapped to one or more of the transmitter-receiver sets 104 to reconfigure the RF circuitry. For example, a base station having a single channel operating in a 4×2 mode of operation can be remotely reconfigured to provide two independent channels having a 2×2 configuration for the transmitter-receiver sets 104. This combined base station (i.e., RF circuitry and baseband circuitry in the box 140) can be advantageously implemented in a scenario where a micro/pica base station operates on a single 20 MHz channel in a 4×2 configuration and can be installed, by way of example, on a light pole in New York City. Two years from installation, the micro/pico base station can receive management communications from a network operation center located in Seattle instructing it to remap its baseband resources and reconfigure the transmitter-receiver sets 104 to support two 20 MHz channels in a 2×2 configuration. Thus, remote reconfiguration of a base station advantageously allows centralized control of a network and minimizes a labor-intensive process of manual base station reconfiguration. Using this approach, an entire network can be reconfigured and reorganized to meet bandwidth demands.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
   a transceiver system having a plurality of transmitter-receiver pairs;
   an antenna coupled to each of the respective plurality of transmitter-receiver pairs;
   a configurable digital interface module configured to route signals to and from the plurality of transmitter-receiver pairs;
   a first modem configured to communicate with the plurality of transmitter-receiver pairs wherein the digital interface module is initially configured to route signals between the first modem and each of the plurality of transmitter-receiver pairs, the first modem being configured to operate in accordance with a first operational mode with the first portion of the plurality of transmitter-receiver pairs; and
   a second modem configured to communicate with the plurality of transmitter-receiver pairs, the second modem being configured to operate in accordance with a second operational mode different from the first operational mode with the second portion of the plurality of transmitter-receiver pairs wherein the digital interface module is reconfigured to route signals between the first modem and a first portion of the plurality of transmitter-receiver pairs and to route signals between the second modem and a second portion of the plurality of transmitter-receiver pairs.

2. The system of claim 1 wherein the digital interface module is initially configured to route downlink signals from the first modem to the transmitters of each of the plurality of transmitter-receiver pairs and to route uplink signals from the receivers of each of the plurality of transmitter-receiver pairs to the first modem and, following reconfiguration to route downlink signals from the first modem to the transmitters of each of the first portion of the plurality of transmitter-receiver pairs, to route uplink signals from the receivers of each of the first portion of the plurality of transmitter-receiver pairs to the first modem, to route downlink signals from the second modem to the transmitters of each of the second portion of the plurality of transmitter-receiver pairs, and to route uplink signals from the receivers of each of the second portion of the plurality of transmitter-receiver pairs to the second modem.

3. The system of claim 1 wherein the digital interface module is initially configured to route downlink signals from the first modem to the transmitters of each of the plurality of transmitter-receiver pairs and to route uplink signals from the receivers of each of the plurality of transmitter-receiver pairs to the first modem and, following reconfiguration to route downlink signals from the first modem to the transmitters of each of the first portion of the plurality of transmitter-receiver pairs, to route downlink signals from the second modem to the transmitters of each of the second portion of the plurality of transmitter-receiver pairs, and to route uplink signals from the receivers of each of the first and second portions of the plurality of transmitter-receiver pairs to both the first and second modems.

4. The system of claim 1 for use with four transmitter-receiver pairs wherein the digital interface module is initially configured to couple the first modem to all four of the transmitter-receiver pairs to thereby permit the first modem and the four transmitter-receiver pairs to operate in a 4×2 operational mode on a downlink and a 1×4 operational mode on an uplink and, when the digital interface module is re-configured for operation with the first and second modems, the first modem and two of the transmitter-receiver pairs being configured to operate in a 2×2 operational mode on the downlink and a 1×2 operational mode on the uplink and the second modem and the remaining two of the transmitter-receiver pairs being configured to operate in a 2×2 operational mode on the downlink and a 1×2 operational mode on the uplink.

5. The system of claim 1 for use with four transmitter-receiver pairs wherein the digital interface module is initially configured to couple the first modem to all four of the transmitter-receiver pairs to thereby permit the first modem and the four transmitter-receiver pairs to operate in a 4×2 operational mode on a downlink and a 1×4 operational mode on an uplink and, when the digital interface module is re-configured for operation with the first and second modems, the first modem and two of the transmitter-receiver pairs being configured to operate in a 2×2 operational mode on the downlink and a 1×4 operational mode on the uplink and the second modem and the remaining two of the transmitter-receiver pairs being configured to operate in a 2×2 operational mode on the downlink and a 1×4 operational mode on the uplink.

6. The system of claim 5 wherein the digital interface module is configured, following reconfiguration, to route uplink signals from the receivers of each of the four transmitter-receiver pairs to both the first and second modems.

7. The system of claim 1, further comprising at least one fiber optic cable to couple the configurable digital interface module to the first and second modems.

8. The system of claim 1 for use with a base station tower wherein the antennas and the plurality of transmitter-receiver pairs are attached to the tower at a location near the top of the tower and the first and second modems are positioned at a location near the bottom of the tower.

9. The system of claim 8 wherein the configurable digital interface module is attached to the tower proximate the plurality of transmitter-receiver pairs and coupled to the first and second modems via a fiber optic cable, the configurable digital interface module being configured for operation in accordance with a Common Public Radio Interface (CPR) standard.

10. The system of claim 8 wherein the configurable digital interface module is attached to the tower proximate the plurality of transmitter-receiver pairs and coupled to the first and second modems via a fiber optic cable, the configurable digital interface module being configured for operation in accordance with an Open Base Station Architecture Initiative (OBSAI) standard.

11. The system of claim 1 for use with a base station tower wherein the antennas, the plurality of transmitter-receiver pairs, and the first and second modems are attached to the tower at a location near the top of the tower.

12. The system of claim 10 wherein the digital interface module and the first and second modems are configured for remote control from a central location, 13. The system of claim 1 for use with base station tower wherein the antennas and the plurality of transmitter-receiver pairs are attached to the tower at a location near the top of the tower and the first and second modems are positioned at a central location remote from the bottom of the tower.

14. The system of claim 1 for use with a plurality of base stations, each base station having the transceiver system, the antenna, the configurable digital interface module, and the first and second modems wherein the first and second modems for each of the plurality of base stations are co-located at a central location.

15. A communication method using a transceiver system having a plurality of transmitter-receiver pairs, the method comprising:
  using a remotely configurable digital interface module to connect the plurality of transmitter-receiver pairs to a first modem;
  activating a second modem; and
  remotely reconfiguring the digital interface module to connect signals between the first modem and a first portion of the plurality of transmitter-receiver pairs and to connect signals between the second modem and a second portion of the plurality of transmitter-receiver pairs wherein the digital interface module is configured, following reconfiguration, to route uplink signals from the receivers of each of the first and second portions of the transmitter-receiver pairs to both the first and second modems.

16. The method of claim 15 for use with a base station tower wherein the plurality of transmitter-receiver pairs are attached to the tower at a location near the top of the tower and the first and second modems are positioned at a location near the bottom of the tower wherein connecting signals between the first modem and the first portion of the plurality of transmitter-receiver pairs and connecting signals between the second modem and the second portion of the plurality of transmitter-receiver pairs comprises coupling the first and second portions of the plurality of transmitter-receiver pairs to the first and second modems, respectively, using at least a first fiber optic cable.

17. The method of claim 15 wherein connecting the plurality of transmitter-receiver pairs to the first modem comprises the digital interface module connecting downlink signals from the first modem to the transmitters of each of the plurality of transmitter-receiver pairs and connecting uplink signals from the receivers of each of the plurality of transmitter-receiver pairs to the first modem and, following reconfiguration, connecting the first portion of the plurality of transmitter-receiver pairs to the first modem comprises connecting downlink signals from the first modem to the transmitters of each of the first portion of the plurality of transmitter-receiver pairs, connecting uplink signals from the receivers of each of the first portion of the plurality of transmitter-receiver pairs to the first modem, and connecting the second portion of the plurality of transmitter-receiver pairs to the second modem comprises connecting downlink signals from the second modem to the transmitters of each of the second portion of the plurality of transmitter-receiver pairs, and connecting uplink signals from the receivers of each of the second portion of the plurality of transmitter-receiver pairs to the second modem.

18. The method of claim 15 wherein connecting the plurality of transmitter-receiver pairs to the first modem comprises the digital interface module connecting downlink signals from the first modem to the transmitters of each of the plurality of transmitter-receiver pairs and connecting uplink signals from the receivers of each of the plurality of transmitter-receiver pairs to the first modem and, following reconfiguration, connecting downlink signals from the first modem to the transmitters of each of the first portion of the plurality of transmitter-receiver pairs, connecting downlink signals from the second modem to the transmitters of each of the second portion of the plurality of transmitter-receiver pairs, and connecting uplink signals from the receivers of each of the first and second portions of the plurality of transmitter-receiver pairs to both the first and second modems.

19. The method of claim 15 for use with four transmitter-receiver pairs wherein using the remotely configurable digital interface module to connect the plurality of transmitter-receiver pairs to the first modem comprises connecting the first modem to all four of the transmitter-receiver pairs to thereby permit the first modem and the four transmitter-receiver pairs to operate in a 4×2 operational mode on a downlink and a 1×4 operational mode on an uplink and, following reconfiguration, connecting signals between the first modem and the first portion of the plurality of transmitter-receiver pairs comprises connecting signals between the first modem and two of the transmitter-receiver pairs to thereby permit the first modem and the two transmitter-receiver pairs to operate in a 2×2 operational mode on the downlink and a 1×2 operational mode on the uplink and connecting signals between the second modem and a second portion of the plurality of transmitter-receiver pairs comprises connecting signals between the second modem and the remaining two of the transmitter-receiver pairs to thereby permit the second modem and the remaining two transmitter-receiver pairs to operate in a 2×2 operational mode on the downlink and a 1×2 operational mode on the uplink.

20. The method of claim 15 for use with four transmitter-receiver pairs wherein using the remotely configurable digital interface module to connect the plurality of transmitter-receiver pairs to the first modem comprises connecting the first modem to all four of the transmitter-receiver pairs to thereby permit the first modem and the four transmitter-receiver pairs to operate in a 4×2 operational mode on a downlink and a 1×4 operational mode on an uplink and, following reconfiguration, connecting signals between the first modem and the first portion of the plurality of transmitter-receiver pairs comprises connecting signals between the first modem and two of the transmitter-receiver pairs to thereby permit the first modem and the two transmitter-receiver pairs to operate in a 2×2 operational mode on the downlink and a 1×4 operational mode on the uplink and connecting signals between the second modem and a second portion of the plurality of transmitter-receiver pairs comprises connecting signals between the second modem and the remaining two of the transmitter-receiver pairs to thereby permit the second modem and the remaining two transmitter-receiver pairs to operate in a 2×2 operational mode on the downlink and a 1×4 operational mode on the uplink.

21. The method of claim 15 wherein the first and second modems both operate in accordance with a first operational mode such that the addition of the second modem substantially doubles system capacity using the first operational mode.

22. The method of claim 15 wherein the first modem operates in accordance with a first operational mode with the first portion of the plurality of transmitter-receiver pairs and the second modem operates in accordance with a second operational mode different from the first operational mode with the second portion of the plurality of transmitter-receiver pairs.

23. The method of claim 15 for use with a base station tower wherein the plurality of transmitter-receiver pairs are attached to the tower at a location near the top of the tower and the first and second modems are positioned at a location near the bottom of the tower.

24. The method of claim 15 for use with a base station tower wherein the plurality of transmitter-receiver pairs and the first and second modems are attached to the tower at a location near the top of the tower.

25. The method of claim 24 wherein remotely reconfiguring the digital interface module comprises sending reconfigurations signals to the digital interface module from a location remote from the base station tower.

26. The method of claim 15 for use with a base station tower wherein the plurality of transmitter-receiver pairs are attached to the tower at a location near the top of the tower and the first and second modems are positioned at a central location remote from the bottom of the tower.

27. The method of claim 15 for use with a plurality of base stations, each base station having the plurality of transmitter-receiver pairs, the configurable digital interface module, and the first and second modems wherein the first and second modems for each of the plurality of base stations are co-located at a central location.

28. A communication method for reconfiguring a base station using a transceiver system having a plurality of transmitter-receiver pairs mounted near a top of a base station tower, the method comprising:
initially configuring the transceiver system to connect the plurality of transmitter-receiver pairs mounted near the top of the base station tower to a first modem;
activating a second modem; and
remotely reconfiguring the transceiver system to connect a first half of the plurality of transmitter-receiver pairs with the first modem and to connect a second half of the plurality of transmitter-receiver pairs with the second modem wherein the first modem operates in accordance with a first operational mode with the first half of the plurality of transmitter-receiver pairs and the second modem operates in accordance with a second operational mode different from the first operational mode with the second half of the plurality of transmitter-receiver pairs.

29. The method of claim 28 wherein connecting the plurality of transmitter-receiver pairs to the first modem comprises connecting downlink signals from the first modem to the transmitters of each of the plurality of transmitter-receiver pairs and connecting uplink signals from the receivers of each of the plurality of transmitter-receiver pairs to the first modem and, following reconfiguration, connecting the first half of the plurality of transmitter-receiver pairs to the first modem comprises connecting downlink signals from the first modem to the transmitters of each of the first half of the plurality of transmitter-receiver pairs, connecting uplink signals from the receivers of each of the first half of the plurality of transmitter-receiver pairs to the first modem, connecting downlink signals from the second modem to the transmitters of each of the second half of the plurality of transmitter-receiver pairs, and connecting uplink signals from the receivers of each of the second half of the plurality of transmitter-receiver pairs to the second modem.

30. The method of claim 28 wherein connecting the plurality of transmitter-receiver pairs to the first modem comprises connecting downlink signals from the first modem to the transmitters of each of the plurality of transmitter-receiver pairs and connecting uplink signals from the receivers of each of the plurality of transmitter-receiver pairs to the first modem and, following reconfiguration, connecting the first half of the plurality of transmitter-receiver pairs to the first modem comprises connecting downlink signals from the first modem to the transmitters of each of the first half of the plurality of transmitter-receiver pairs, connecting downlink signals from the second modem to the transmitters of each of the second half of the plurality of transmitter-receiver pairs, and connecting uplink signals from the receivers of each of the plurality of transmitter-receiver pairs to both the first and second modems.

31. The method of claim 28, further comprising replacing the second modem operating in accordance with the second operational mode with a second modem operating in accordance with the first operational mode wherein the first and second modems both operate in accordance with the first operational mode such that the addition of the second modem operating in accordance with the first operational mode substantially doubles system capacity using the first operational mode.

32. The method of claim 28 wherein the plurality of transmitter-receiver pairs and the first and second modems are attached to the tower at a location near the top of the tower.

33. The method of claim 32 wherein remotely reconfiguring transceiver system comprises sending reconfigurations signals to the transceiver system from a location remote from the base station tower.

34. The method of claim 28 wherein the plurality of transmitter-receiver pairs are attached to the tower at a location near the top of the tower and the first and second modems are positioned at a central location remote from the base station tower.

35. The method of claim 28 for use with a plurality of base stations, each base station having the plurality of transmitter-receiver pairs and the first and second modems wherein the first and second modems for each of the plurality of base stations are co-located at a central location.

* * * * *